United States Patent [19]

McCoy et al.

[11] Patent Number: 5,727,806
[45] Date of Patent: Mar. 17, 1998

[54] UTILITY TOW BAR

[75] Inventors: Richard McCoy, Granger, Ind.; David L. Kulp, Edwardsburg, Mich.; Lori A. Birky, Bristol, Ind.

[73] Assignee: Reese Products, Inc., Elkhart, Ind.

[21] Appl. No.: 562,255

[22] Filed: Nov. 22, 1995

[51] Int. Cl.$^6$ .................................. B60D 1/16
[52] U.S. Cl. ........................... 280/494; 280/491.1
[58] Field of Search ................ 280/491.1, 491.5, 280/492, 493, 494, 511, 491.3, 491.4

[56] References Cited

U.S. PATENT DOCUMENTS

| | | | |
|---|---|---|---|
| 2,444,086 | 6/1948 | Baker, Jr. | 280/494 |
| 2,859,050 | 11/1958 | Stonerock et al. | 280/493 X |
| 3,083,040 | 3/1963 | Hayman et al. | 280/493 |
| 3,281,162 | 10/1966 | Carson | 280/493 X |
| 3,510,146 | 5/1970 | Hartman | 280/494 |
| 3,796,443 | 3/1974 | Crutchfield | 280/493 |
| 3,938,830 | 2/1976 | Lane | 280/493 |
| 4,711,461 | 12/1987 | Fromberg | 280/494 |
| 4,768,803 | 9/1988 | Hewitt et al. | 280/462 |
| 5,263,745 | 11/1993 | Storey | 280/483 |

*Primary Examiner*—Kevin Hurley
*Attorney, Agent, or Firm*—King and Schickli

[57] ABSTRACT

A utility tow bar includes a coupler assembly, a pair of tow arms and fasteners for securing the tow arms to the coupler assembly. More specifically, the coupler assembly includes a tow arm receiving channel for holding the tow arms as well as a hitch ball receiving socket and hitch ball lock for connecting the utility tow bar to a towing vehicle. Preferably the tow arms are substantially S-shaped. Each tow arm is connected at its proximal end to the coupler assembly. Each tow arm includes a connector at its distal end for connecting to a trailing vehicle. Two sets of aligned mounting apertures are provided in the coupler assembly and tow arms. A pair of pull pins are received in the aperture sets to secure the tow arms and coupler assembly together. Pin clips secure the pull pins in position.

6 Claims, 2 Drawing Sheets

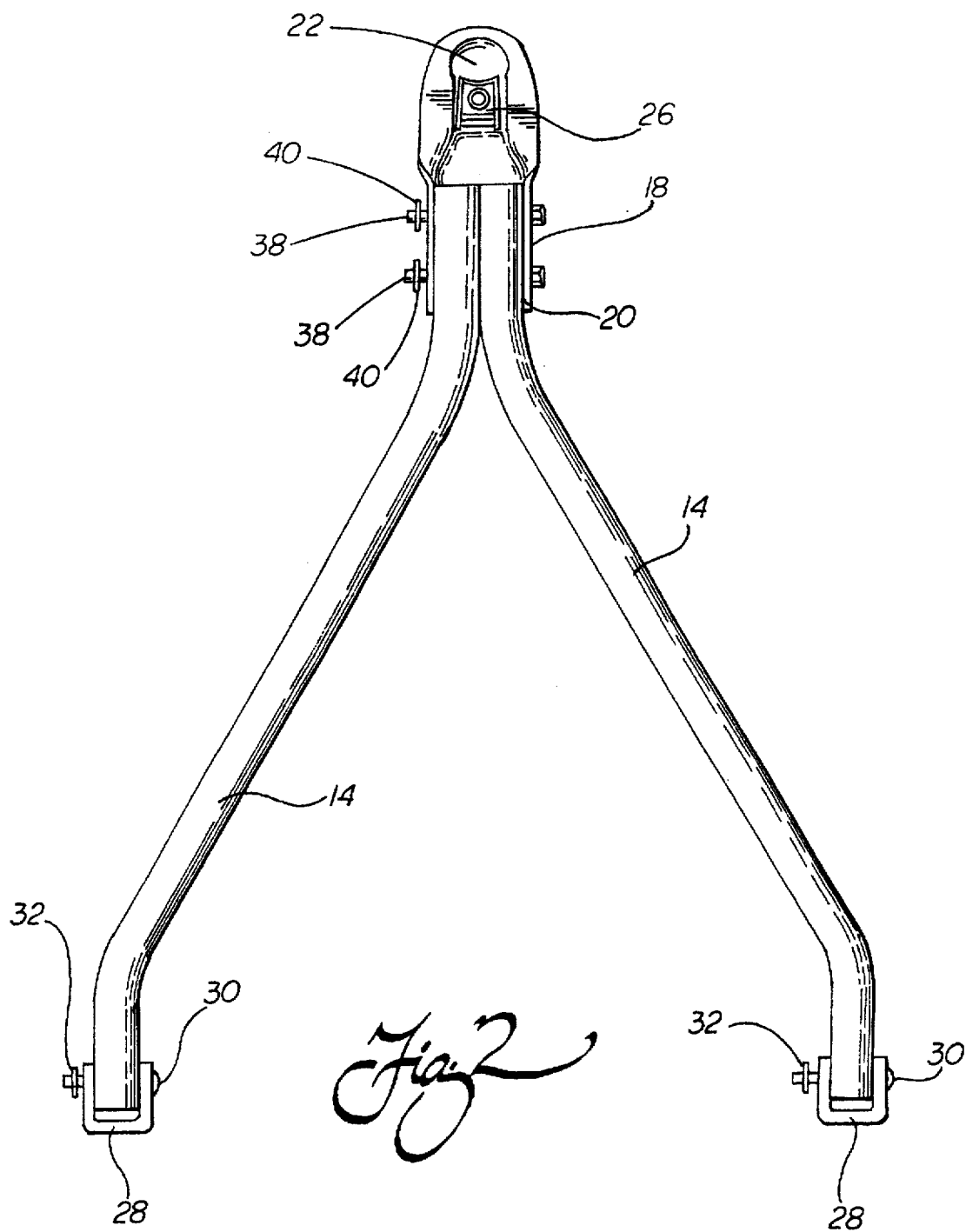

UTILITY TOW BAR

TECHNICAL FIELD

The present invention relates generally to the towing field and, more particularly, to a utility tow bar for towing a trailing vehicle behind a towing vehicle.

BACKGROUND OF THE INVENTION

Utility tow bars for towing a trailing vehicle such as an automobile behind a towing vehicle such as a motor home, truck or larger automobile have long been known in the art. Examples of such utility tow bars are disclosed in, for example, U.S. Pat. Nos. 3,510,146 to Hartman; 3,938,830 to Lane; and 4,768,803 to Hewitt et al. As should be appreciated from reviewing these references, generally, such utility tow bars comprise a coupler assembly including a hitch ball receiving socket and cooperating lock. This allows one to selectively connect the utility tow bar to the hitch ball of a trailer hitch receiver carried by a towing vehicle. Such utility tow bars also include a pair of outwardly depending tow arms secured at their proximal ends to the coupler assembly. The distal end of each tow arm includes a bumper bracket or other connector which may be secured to the bumper or other component of the trailing vehicle (e.g. automobile) to be towed.

It, of course, is easily appreciated that any utility tow bar must be sufficiently strong and rigid to properly function under the tensile and other loads to which it is subjected during towing. It must also be appreciated, however, that the utility tow bar must be easily manipulated and convenient to use to provide the utmost function and consumer satisfaction. While the utility tow bars disclosed in, for example, the Hartman, Lane and Hewitt et al. patents provide the necessary degree of function, they are not particularly user friendly. In fact, none of the prior art utility tow bars known to the applicants readily allow assembly for use and total disassembly for storage in a confined and out of the way area. Further, none allow assembly/disassembly in a quick and efficient manner without the use of any tools; the ultimate achievement in user convenience.

SUMMARY OF THE INVENTION

Accordingly, it is a primary object of the present invention to provide an improved utility tow bar of simple and inexpensive construction that is light weight while also providing high strength.

Another object of the present invention is to provide a utility tow bar that is user friendly, allowing easy assembly and disassembly so that the tow bar may be conveniently stored in an out of the way corner of a trunk of a vehicle and assembled in a quick and convenient manner when necessary for use.

Yet another object of the present invention is to provide a utility tow bar that may be easily assembled and disassembled without the use of any tools with the utmost convenience and optimum functionality for the user.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved utility tow bar is provided for towing a trailing vehicle behind a towing vehicle. The utility tow bar includes a coupler assembly allowing connection to the towing vehicle. Preferably, the coupler assembly includes a hitch ball receiving socket and a hitch ball lock that allows the coupler assembly to be secured to a hitch ball carried on a trailer hitch receiver connected to the towing vehicle.

The utility tow bar also includes a pair of tow arms. Preferably, each tow arm is constructed as a tube from a high strength metal such as steel. This insures both the necessary strength for reliable towing performance under substantially any foreseeable operating conditions and low weight for ease of manipulation during installation. Each tow arm also preferably includes a proximal end that is releaseably attached to the coupler assembly and a distal end including a connector for connecting to the trailing vehicle. A fastening means is provided for securing the proximal ends of the pair of tow arms to the coupler assembly. Advantageously, the fastening means may be manipulated without tools to allow quick and convenient assembly/disassembly of the utility tow bar.

More specifically describing the invention, the coupler assembly preferably includes a tow arm receiving channel. Each tow arm is substantially S-shaped and the proximal ends of the pair of tow arms are received in parallel in the tow arm receiving channel of the coupler assembly. Preferably the fastening means includes (a) two sets of aligned mounting apertures in the coupler assembly and pair of tow arms, (b) a pair of pull pins and (c) a pair of pin clips. One pull pin is received in and extends through each set of aligned apertures in the tow arms and coupler assembly. The pin clips attach to the pull pins to secure the pull pins in position. In this way, it is possible to secure the tow arms in the coupler assembly so that the utility tow bar may be utilized in a towing operation. When the towing operation is completed, the utility tow bar may be easily disassembled. This is done by first manually removing the pin clips from the pull pins. The pull pins are then removed from the two sets of the aligned mounting apertures. The two tow arms may then be separated from each other and the coupler assembly. The individual components may then be easily stored, for example, in a convenient location in the corner of the trunk where they will not otherwise interfere with the use of the trunk. No tools are necessary to complete the assembly and disassembly. Further, the assembly/disassembly operation may be completed almost instantaneously. This is a level of convenience heretofore totally foreign to users of utility tow bars.

In accordance with yet another aspect of the present invention a method is provided for assembling a tow bar. The method broadly includes the steps of placing tow arms of the tow bar in the coupler assembly and securing the tow arms and coupler assembly together manually without the use of tools. This involves inserting pull pins through aligned apertures in the tow arms and coupler assembly and securing the pull pins in position with pin clips.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 2 is a bottom plan view showing the tool-free connection of the tow arms to the coupler assembly by means of two pull pins.

Figure 1:
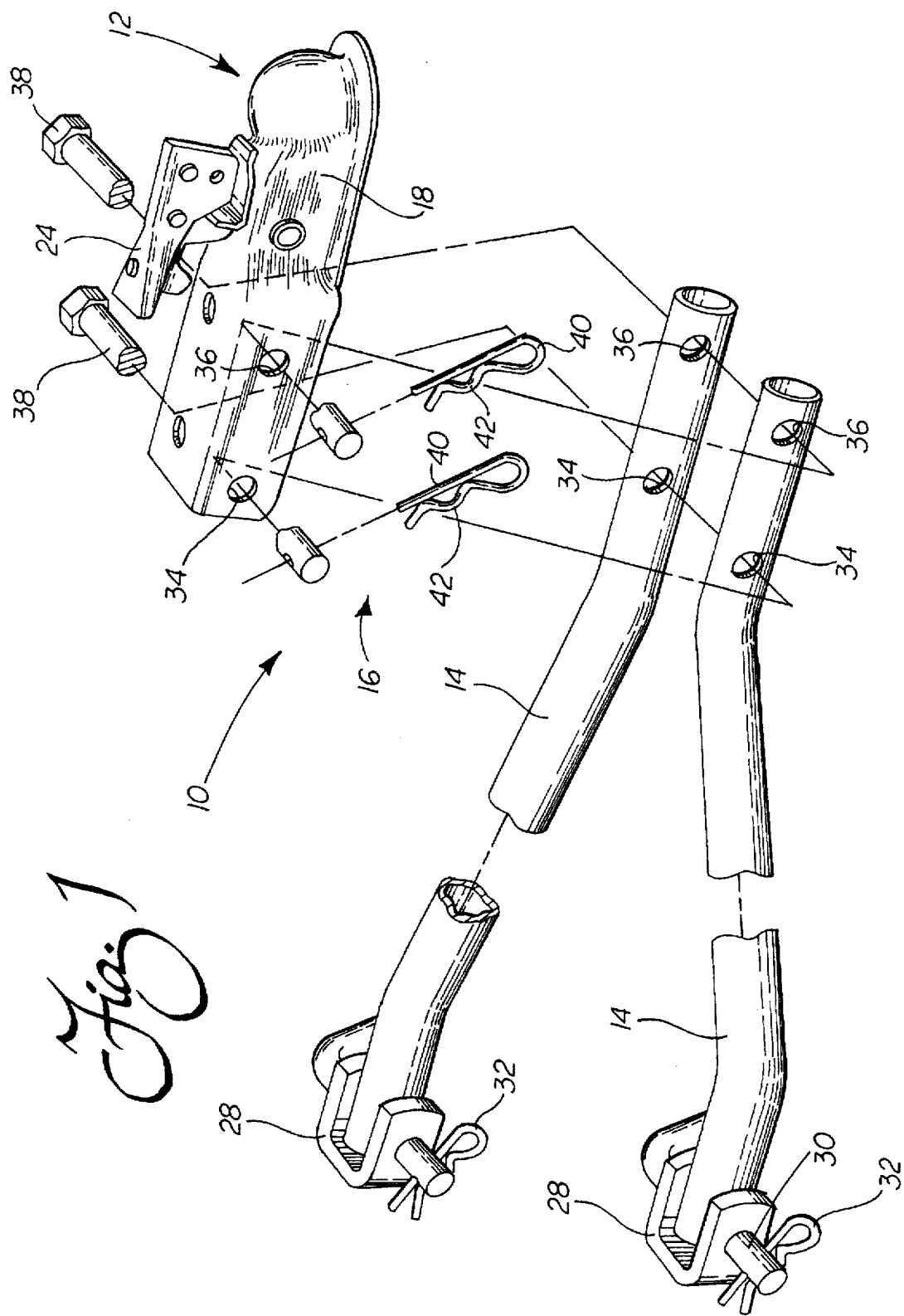
FIG. 1 is an exploded perspective view of the utility tow bar of the present invention.

Reference will now be made in detail to the present preferred embodiment of the invention, an example of which is illustrated in the accompanying drawing.

DETAILED DESCRIPTION OF THE INVENTION

Reference is now made to the drawing Figures showing the utility tow bar 10 of the present invention. The utility tow bar 10 includes a coupler assembly, generally designated by the reference numeral 12, a pair of tow arms 14 of tubular construction and fastening means for securing the proximal ends of the tow arms to the coupler assembly, the fastening means being generally designated by reference numeral 16.

More specifically describing the invention, the coupler assembly 12 includes a body 18 preferably forged or cast from a high strength metal such as steel. The coupler assembly or body 18 preferably includes a tow arm receiving channel 20 and a hitch ball receiving socket 22. Further, the body 18 carries a hitch ball lock of a type known in the art comprising an operating lever 24 and a cooperating latch 26. As is known in the art, the hitch ball receiving socket 22 and hitch ball lock 24, 26 allow the coupler assembly 12 to be connected to a hitch ball (not shown). As is known in the art, such a hitch ball may be carried on a draw bar or a ball mount head of a weight distributing hitch held in a hitch receiver mounted to a towing vehicle.

As further shown in FIG. 1, each tow arm 14 is substantially S-shaped. As shown in FIG. 2, the proximal ends of each tow arm 14 are aligned side by side in parallel so that they may be received in the tow arm receiving channel 20 of the coupler assembly 12. The distal ends of the tow arms 14 each include a connector 28 such as a bumper bracket of a type known in the art, that may be connected to a trailing vehicle such as an automobile to be towed by the towing vehicle. As shown, each bumper bracket connector 28 is secured to the distal end of each tow arm 14 by means of a pull pin 30 which extends through cooperating apertures in the U-shaped bumper bracket connector and the sidewall of the tubular tow arm. A spring clip 32 may be utilized to secure each pull pin 30 in position. It should, of course, be appreciated that the pivotal movement of the bumper bracket connector 28 about the pull pin 30 serves to help accommodate the relative movement of the towing and trailing vehicles as they traverse bumps, dips and/or underlating pavement during towing.

As noted above, the proximal end of the tow arms 14 are secured in the coupler assembly 12 by means of the fastening means 16. Preferably, the fastening means 16 comprises two sets of aligned mounting apertures 34, 36 in the body 18 of the coupler assembly 12 and each of the pair of tow arms 14. A pair of pull pins 38 are provided. One pull pin 38 is received in and extends through the first set of mounting apertures 34 and the other pull pin is received in and extends through the second set of mounting apertures 36. A pair of spring clips 40 are attached to the pull pins 38 adjacent to the distal end thereof to secure the pull pins in position. More specifically, each spring clip 40 defines a notch 42 that engages a pull pin 38.

Advantageously, it should be appreciated that the utility tow bar 10 of the present invention is of simple and inexpensive construction. There are no welded components and, accordingly, no unsightly welds which are prone to paint chipping and the onset of the rusting process when exposed to inclement weather conditions over time. The utility tow bar 10 also provides the necessary high strength for withstanding towing loads and is also constructed to reduce material requirements and thereby the overall weight thereof. This allows an individual to more easily manipulate the tow bar 10 as required during installation for towing.

It should be appreciated that the utility tow bar 10 is particularly user friendly. Specifically, it is easy to assemble/disassemble. Accordingly, when not in use, the utility tow bar 10 may be broken down into individual components that may be placed in a convenient, out of the way location such as the corner of a trunk. In this way, the trunk remains essentially fully functional and accessible for other purposes such as the holding of luggage, business equipment or golf clubs. When needed for towing, the individual components (i.e. the two tow arms 14 and the coupler assembly 12), may then be removed from the trunk. The spring clips 40 are then removed from the pull pins 38. The pull pins 38 are then removed from the body 18 of the coupler assembly 12. The tow arms 14 are then aligned and the proximal ends thereof are placed side-by-side in the tow arm receiving channel 20 of the coupler assembly 12. The two sets of mounting apertures 34, 36 are aligned and the pull pins 38 are then inserted fully through the aligned mounting apertures. The spring clips 40 are then engaged on the pull pins 38 by means of the notches 42. At this point the assembly of the utility tow bar 10 has been completed. It is a simple process that may be accomplished in a very short period of time. Further, it is important to note that the removal and insertion of only two pull pins 38 allows the assembly. Advantageously, this may be accomplished without the use of any tools. This is an important factor when considering the convenience of an individual in completing the assembly operation.

After the utility tow bar 10 has been utilized in a towing operation, it may then be disassembled and returned to a convenient storage location. To disassemble, the two spring clips 40 and then the two pull pins 38 are removed. This is done without the use of any tools and this is all that is necessary to break the utility tow bar 10 down into the individual components (i.e. two tow arms 14 and coupler assembly 12). These may then be easily stored in a desired, out of the way location. No other utility tow bar provides such full function and user convenience.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A utility tow bar for towing a trailing vehicle behind a towing vehicle, comprising:

a coupler assembly allowing connection to the towing vehicle;

a pair of tow arms, each tow arm having a proximal end releasably attached to said coupler assembly and a distal end including a connector for connecting to said trailing vehicle; and fastening means for securing said proximal ends of said pair of tow arms to said coupler assembly, said fastening means including two sets of aligned mounting apertures in said coupler assembly and said pair of tow arms, a pair of pull pins, one pull pin being received in each of said two sets of aligned apertures, and a pair of pin clips attached to said pull pins to secure said pull pins in position, said fastening means being manipulatable without tools to allow quick and convenient assembly/disassembly of said utility tow bar.

2. The utility tow bar set forth in claim 1, wherein said coupler assembly includes a tow arm receiving channel.

3. A utility tow bar for towing a trailing vehicle behind a towing vehicle, comprising:

a coupler assembly including a tow arm receiving channel allowing connection to the towing vehicle;

a pair of tow arms, each tow arm having a proximal end releasably attached to said coupler assembly and a distal end including a connector for connecting to said trailing vehicle, each tow arm being substantially S-shaped and said proximal ends of said pair of tow arms being received in parallel in said tow arm receiving channel of said coupler assembly; and fastening means for securing said proximal ends of said pair of tow arms to said coupler assembly, said fastening means being manipulatable without tools to allow quick and convenient assembly/disassembly of said utility tow bar.

4. The utility tow bar set forth in claim 3, wherein said fastening means includes two sets of aligned mounting apertures in said coupler assembly and said pair of tow arms; a pair of pull pins, one pull pin being received in each of said two sets of aligned apertures; and a pair of pin clips attached to said pull pins to secure said pull pins in position.

5. The utility tow bar set forth in claim 4, wherein said coupler assembly further includes a hitch ball receiving socket and a hitch ball lock.

6. A method of assembling a tow bar for towing a trailing vehicle behind a towing vehicle, comprising:

placing tow arms of said tow bar in a tow arm receiving channel of a coupler assembly;

inserting pull pins through two sets of aligned apertures in both of said tow arms and said coupler assembly, one of said pull pins being received through each of said two sets of aligned apertures so that each of said pull pins extends through both of said tow arms;

securing said pull pins in position with pin clips.

* * * * *